US009759394B2

(12) United States Patent
Aubuchon (10) Patent No.: US 9,759,394 B2
(45) Date of Patent: *Sep. 12, 2017

(54) SHAFT-LESS RADIAL VANE TURBINE GENERATOR

(71) Applicant: Michael S. Aubuchon, Pismo Beach, CA (US)

(72) Inventor: Michael S. Aubuchon, Pismo Beach, CA (US)

( * ) Notice: Subject to any disclaimer, the term of this patent is extended or adjusted under 35 U.S.C. 154(b) by 71 days.

This patent is subject to a terminal disclaimer.

(21) Appl. No.: 14/721,892

(22) Filed: May 26, 2015

(65) Prior Publication Data

US 2015/0267884 A1    Sep. 24, 2015

Related U.S. Application Data

(63) Continuation of application No. 13/836,272, filed on Mar. 15, 2013, now Pat. No. 9,057,353.

(51) Int. Cl.
*F21S 9/04* (2006.01)
*F03B 13/10* (2006.01)
(Continued)

(52) U.S. Cl.
CPC .............. *F21S 9/046* (2013.01); *F01D 15/10* (2013.01); *F03B 13/10* (2013.01); *F21V 33/0076* (2013.01); *F05B 2220/20* (2013.01); *F21W 2111/00* (2013.01); *F21W 2131/40* (2013.01); *Y02E 10/22* (2013.01)

(58) Field of Classification Search
CPC .......... F21S 9/046; F21S 9/04; H02K 7/1823; H02K 21/38; F03B 3/04; F03B 3/126; F21Y 2103/022; F05B 2220/20; Y02B 20/386; B05B 3/04; A61B 5/09; A62C 31/005; A62C 31/02; A62C 33/00; A63H 29/14; B65H 2701/33; B65H 75/364; F04C 2/344; F04D 13/027; F04D 13/064; F04D 13/0646; F04D 29/186; G01F 1/10; Y02E 10/223
USPC ......... 290/1 B, 44, 55, 54, 43; 416/111, 119, 416/117, 85; 310/58, 60 R; 60/398; 415/3.1
See application file for complete search history.

(56) References Cited

U.S. PATENT DOCUMENTS 2,357,333 A * 9/1944 Steen ...................... F01C 1/344
                                                          418/267
2,436,683 A    4/1945 Wood, Jr.
(Continued)

OTHER PUBLICATIONS

Examiner Interview Summary from U.S. Appl. No. 13/836,272 mailed Dec. 8, 2014.
(Continued)

*Primary Examiner* — Tulsidas C Patel
*Assistant Examiner* — Charles Reid, Jr.
(74) *Attorney, Agent, or Firm* — Fitch, Even, Tabin & Flannery LLP (57) ABSTRACT

A generator having a coupling adapted to couple at least two fluid conduits together; an axial flow channel defined by the hose coupling and having an axis; a conductive coil in the hose coupling enveloping the axial flow channel; a rotor rotatable relative to the conductive coil and encircled by the conductive coil; a plurality of vanes coupled to the rotor and projecting radially toward the axis, but not intersecting the axis.

3 Claims, 6 Drawing Sheets

(51) Int. Cl.
  *F01D 15/10* (2006.01)
  *F21V 33/00* (2006.01)
  *F21W 111/00* (2006.01)
  *F21W 131/40* (2006.01)

(56) References Cited

U.S. PATENT DOCUMENTS

| | | | |
|---|---|---|---|
| 3,290,067 A * | 12/1966 | Buckle | A62C 33/00 |
| | | | 285/247 |
| 3,804,336 A | 4/1974 | Koeppe | |
| 3,845,291 A | 10/1974 | Portyrata | |
| 3,867,655 A | 2/1975 | Stengel | |
| 4,560,916 A * | 12/1985 | Yoshiyuki | H02J 7/14 |
| | | | 320/138 |
| 4,564,889 A | 1/1986 | Bolson | |
| 4,616,298 A | 10/1986 | Bolson | |
| 4,731,545 A | 3/1988 | Lerner | |
| 4,946,354 A * | 8/1990 | Aubry | B64C 27/54 |
| | | | 416/157 A |
| 4,963,780 A | 10/1990 | Hochstrasser | |
| 5,017,103 A * | 5/1991 | Dahl | A61M 1/101 |
| | | | 417/420 |
| 5,043,592 A | 8/1991 | Hochstrasser | |
| 5,109,534 A | 4/1992 | Naito | |
| 5,267,129 A * | 11/1993 | Anderson | A61C 1/088 |
| | | | 362/119 |
| 5,358,177 A | 10/1994 | Cashmore | |
| 5,525,842 A * | 6/1996 | Leininger | B23B 31/02 |
| | | | 290/43 |
| 5,616,973 A * | 4/1997 | Khazanov | H02K 5/20 |
| | | | 310/54 |
| 5,623,890 A * | 4/1997 | Lenske | A62B 3/00 |
| | | | 116/205 |
| 5,696,419 A * | 12/1997 | Rakestraw | H02K 21/24 |
| | | | 290/43 |
| 5,699,833 A | 12/1997 | Tsataros | |
| 5,795,053 A | 8/1998 | Pierce | |
| 5,962,942 A * | 10/1999 | Pullen | H02K 1/2793 |
| | | | 310/156.37 |
| 5,986,379 A * | 11/1999 | Hollenbeck | H02K 1/145 |
| | | | 310/216.038 |
| 6,034,465 A * | 3/2000 | McKee | F04D 13/0666 |
| | | | 310/156.23 |
| 6,036,333 A | 3/2000 | Spiller | |
| 6,116,520 A | 9/2000 | Lee | |
| 6,215,212 B1 * | 4/2001 | Grennan | H02K 1/32 |
| | | | 310/58 |
| 6,257,750 B1 | 7/2001 | Strasser | |
| 6,609,804 B2 | 8/2003 | Nolan | |
| 6,719,214 B1 * | 4/2004 | Shaffer | A62C 31/02 |
| | | | 169/16 |
| 6,766,761 B1 * | 7/2004 | Tamez, Jr. | A62B 3/00 |
| | | | 116/205 |
| 6,805,458 B2 | 10/2004 | Schindler | |
| 6,854,148 B1 * | 2/2005 | Rief | E04H 4/1654 |
| | | | 15/1.7 |
| 7,091,628 B1 * | 8/2006 | Balt | F03B 17/00 |
| | | | 290/43 |
| 7,121,495 B2 | 10/2006 | Caamano | |
| 7,125,224 B2 * | 10/2006 | Raymond | F01C 21/0836 |
| | | | 415/185 |
| 7,284,495 B2 | 10/2007 | Seiford, Sr. | |
| 7,571,867 B2 | 8/2009 | Hu | |
| 7,608,936 B2 * | 10/2009 | Shimizu | E03C 1/0404 |
| | | | 290/43 |
| 7,701,076 B2 * | 4/2010 | Baarman | C02F 1/325 |
| | | | 290/43 |
| 7,723,860 B2 | 5/2010 | Nagler | |
| 7,841,732 B2 | 11/2010 | Coushaine | |
| 7,942,544 B2 | 5/2011 | Smathers | |
| 8,035,244 B2 | 10/2011 | Sutherland | |
| D648,470 S | 11/2011 | Rains | |
| 8,109,645 B2 | 2/2012 | Liao | |
| 8,182,214 B2 * | 5/2012 | Dickertmann | F04D 29/167 |
| | | | 415/203 |
| 8,333,709 B2 * | 12/2012 | Wang | A61B 5/0002 |
| | | | 600/539 |
| 2003/0147238 A1 | 8/2003 | Allen | |
| 2004/0200536 A1 | 10/2004 | Strasser | |
| 2005/0184674 A1 | 8/2005 | Kaler | |
| 2006/0016606 A1 * | 1/2006 | Tubel | E21B 41/0085 |
| | | | 166/386 |
| 2007/0037470 A1 | 2/2007 | Rothan | |
| 2007/0126237 A1 | 6/2007 | Liao | |
| 2007/0229274 A1 * | 10/2007 | Patel | G07C 9/00111 |
| | | | 340/572.4 |
| 2008/0022920 A1 | 1/2008 | Custodis | |
| 2008/0223951 A1 * | 9/2008 | Tracey | A01G 25/16 |
| | | | 239/71 |
| 2009/0015019 A1 * | 1/2009 | Donaghey | F03D 3/002 |
| | | | 290/55 |
| 2009/0026769 A1 * | 1/2009 | Shimizu | E03C 1/0404 |
| | | | 290/54 |
| 2009/0120350 A1 * | 5/2009 | Tamez, Jr. | A62B 3/00 |
| | | | 116/205 |
| 2009/0121044 A1 | 5/2009 | Lo | |
| 2009/0188138 A1 | 7/2009 | Murphy | |
| 2012/0006419 A1 | 1/2012 | Richardson | |
| 2012/0061108 A1 * | 3/2012 | Cerrano | A62C 37/00 |
| | | | 169/46 |
| 2012/0120630 A1 | 5/2012 | Liao | |
| 2012/0138058 A1 * | 6/2012 | Fu | A61M 16/0066 |
| | | | 128/204.23 |
| 2012/0211974 A1 * | 8/2012 | Richardson | A62C 33/00 |
| | | | 285/93 |
| 2013/0039784 A1 * | 2/2013 | Teubel | F04D 29/026 |
| | | | 417/355 |
| 2013/0315760 A1 * | 11/2013 | Torii | F04D 13/06 |
| | | | 417/420 |
| 2014/0030984 A1 * | 1/2014 | Wagoner | H03K 17/689 |
| | | | 455/73 |

OTHER PUBLICATIONS

Final Office Action from U.S. Appl. No. 13/836,272 mailed Oct. 1, 2014.
Non-Final Office Action from U.S. Appl. No. 13/836,272 mailed Apr. 7, 2014.
Notice of Allowance from U.S. Appl. No. 13/836,272 mailed Feb. 12, 2015.

* cited by examiner

SHAFT-LESS RADIAL VANE TURBINE GENERATOR

CROSS-REFERENCE TO RELATED APPLICATIONS

This application is a continuation of U.S. application Ser. No. 13/836,272, filed Mar. 15, 2013, for SHAFT-LESS RADIAL VANE TURBINE GENERATOR, which is incorporated in its entirety herein by reference.

BACKGROUND OF THE INVENTION

1. Field of the Invention

The present invention relates generally to power generation using energy from fluid flow through a cylinder, and more specifically to power generation by a shaft-less radial vane turbine generator. Even more specifically, the present invention relates to power generation by a shaft-less radial vane turbine generator in a hose coupling, such as a fire hose coupling.

2. Discussion of the Related Art

Fire hoses are coupled together with fire hose couplings. These couplings are well known in the art. Typically, one side of a coupling has an expansion ring to attach the coupling to its respective hose. On the other side of the coupling are usually a set of internal or external threads for fastening the coupling to complementary (external or internal) threads of another coupling. Usually, a fire truck is provided with a male connector to which a female coupling is fastened. A fire hose assembly is then concatenated by coupling together sequential male and female couplings.

Firefighters operating in dark and smoke-filled environments are prone to becoming disoriented. In conditions of poor visibility, it is extremely helpful to have some means for the firefighter to determine which way leads to the exit, i.e. which hose direction leads back toward the fire truck. Firefighters may be taught to seek out, for example, the female coupling of the connection as an indicator that this side of the connection leads back to the fire truck. However, this method is not satisfactory because a firefighter, in the heat of the moment, may not remember which coupling points back to the fire truck or he or she may not be able to properly see or feel the couplings. Furthermore, the fire hoses may not have been assembled in the expected (conventional) way, and thus reliance on the assumption that, for example, the female coupling, leads back to the fire truck, may in fact lead the firefighter to head the wrong direction. As will be appreciated, these issues are a matter of life and death to firefighters.

Generally, it is common for firefighters to work in pitch-black conditions as in most fire scenes, the first thing to do is to cut off the electricity in the building that is on fire. Thus, in order to function adequately in such poorly illuminated environment, firefighters usually have to depend upon the light emitting from the flashlight mounted on their helmets. However, since the total equipment that a fully-equipped firefighter has to bear can weight more than 20 kilograms, it is impossible or unbearable for a fireman to attach a heavy and cumbersome high-power flashlight on his/her helmet. Not to mention that a fireman operating a fire nozzle for fighting fire will have to have both hands on the fire nozzle since the high water pressure inside the fire hose causes it to be very heavy, stiff and thus difficult to control, and thus, he/she will have no spare hand or strength to hold on to and operate a heavy high-power flashlight for either illuminating the fire scene or firefighting command.

SUMMARY OF THE INVENTION

Several embodiments of the invention advantageously address the needs above as well as other needs by providing a system and method for power generation by a shaft-less radial vane turbine generator in a hose coupling, such as a fire hose coupling.

In one embodiment, the invention can be characterized as a generator comprising a coupling adapted to couple at least two fluid conduits together; an axial flow channel defined by the hose coupling and having an axis; a conductive coil in the hose coupling enveloping the axial flow channel; a rotor rotatable relative to the conductive coil and encircled by the conductive coil; a plurality of vanes coupled to the rotor and projecting radially toward the axis, but not intersecting the axis.

BRIEF DESCRIPTION OF THE DRAWINGS

The above and other aspects, features and advantages of several embodiments of the present invention will be more apparent from the following more particular description thereof, presented in conjunction with the following drawings.

Corresponding reference characters indicate corresponding components throughout the several views of the drawings. Skilled artisans will appreciate that elements in the figures are illustrated for simplicity and clarity and have not necessarily been drawn to scale. For example, the dimensions of some of the elements in the figures may be exaggerated relative to other elements to help to improve understanding of various embodiments of the present invention. Also, common but well-understood elements that are useful or necessary in a commercially feasible embodiment are often not depicted in order to facilitate a less obstructed view of these various embodiments of the present invention.

DETAILED DESCRIPTION

The following description is not to be taken in a limiting sense, but is made merely for the purpose of describing the general principles of exemplary embodiments. The scope of the invention should be determined with reference to the claims.

Reference throughout this specification to "one embodiment," "an embodiment," or similar language means that a particular feature, structure, or characteristic described in connection with the embodiment is included in at least one embodiment of the present invention. Thus, appearances of the phrases "in one embodiment," "in an embodiment," and similar language throughout this specification may, but do not necessarily, all refer to the same embodiment.

Furthermore, the described features, structures, or characteristics of the invention may be combined in any suitable manner in one or more embodiments. In the following description, numerous specific details are provided. One skilled in the relevant art will recognize, however, that the invention can be practiced without one or more of the specific details, or with other methods, components, materials, and so forth. In other instances, well-known structures, materials, or operations are not shown or described in detail to avoid obscuring aspects of the invention.

Figure 1:
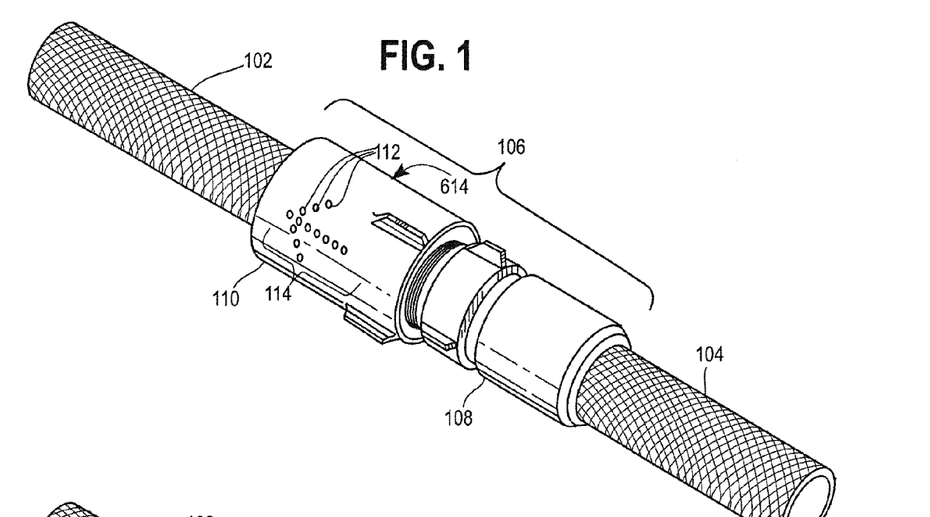
FIG. 1 is a partial perspective view of a first hose, such as a first fire hose, coupled to a second hose, such as a second fire hose, utilizing a coupler, in accordance with one embodiment of the present invention.

Referring first to FIG. 1, shown is a partial perspective view of a first hose 102, such as a first fire hose 102, coupled to a second hose 104, such as a second fire hose 104, utilizing a coupler 106, in accordance with one embodiment of the present invention. Alternatively, the coupler 106 shown may be an adapter, nozzle, or other conveyance.

The coupler 106 comprises a male coupler 110, and a female coupler 108 that are threadably engaged with one another. As shown, the male coupler 110 includes a plurality of light emitting diodes (LEDs 112) positioned so as to be visible from an exterior of the male coupler 110. (In accordance with one variation, other electrically energized illumination sources may be used, such as incandescent light bulbs, in lieu of the LEDs 112). The LEDs 112 are arranged in the form of an arrow 114 so as to create an indication by an electrically illuminated arrow 114, or other directional pointer, to indicate the direction of egress or exit away from the fire involved area nearer a distal end (not shown) of the second fire hose 104, e.g., nearer a nozzle (not shown), than to a distal end (not shown) of the first fire hose 102 e.g., nearer a fire truck or fire plug.

In operation, electrical energy is generated by the power generator within the male coupler 110 in response to flow of fluid, such as water, through the male coupler 110, e.g., through the coupler 106, and the first fire hose 102 and the second fire hose 104. In the embodiment shown, the fluid flow is in a direction opposite the direction indicated by the electrically illuminated arrow 114. The electrical energy may be stored in an energy storage device such as a battery, or an ultracapacitor, within the male coupler 110, or may be directly utilized. In either case, the electrical energy is used to power the light emitting diodes 112, which may be continuously illuminated, or may flash, in accordance with variations of the present embodiment.

Figure 2:
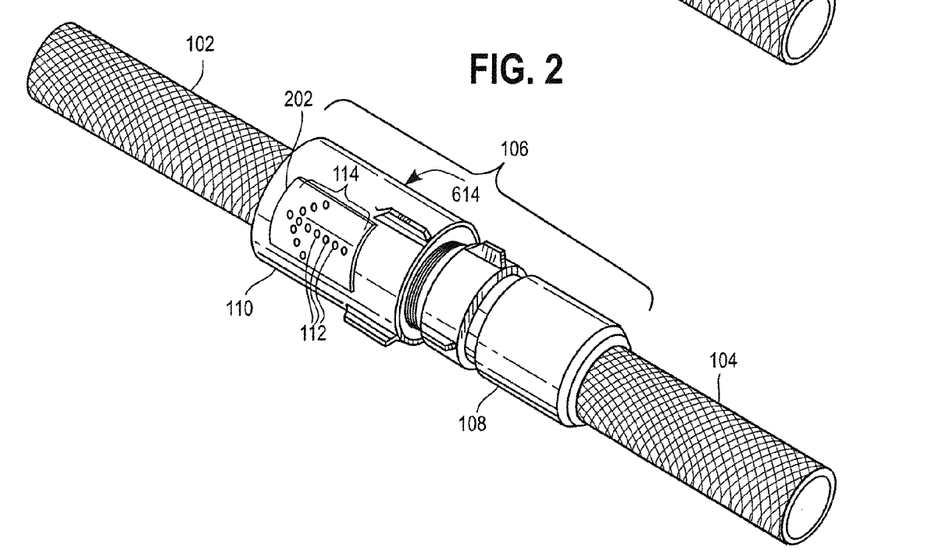
FIG. 2 is a partial perspective view of the first hose, such as the first fire hose, coupled to the second hose, such as the second fire hose, utilizing the coupler, in accordance with another embodiment of the present invention.

Referring next to FIG. 2, shown is a partial perspective view of the first hose 102, such as the first fire hose 102, coupled to the second hose 104, such as the second fire hose 104, utilizing the coupler 106, in accordance with another embodiment of the present invention. Alternatively, the coupler 106 shown may be an adapter, nozzle, or other conveyance.

The coupler 106 comprises a male coupler 110, and a female coupler 108 that are threadably engaged with one another. As shown, the male coupler 110 includes a plurality of light emitting diodes (LEDs 112) positioned so as to be visible from an exterior of the male coupler 110. (In accordance with one variation, other electrically energized illumination sources may be used, such as incandescent light bulbs, in lieu of the LEDs 112). The LEDs 112 are arranged in the form of an arrow 114 so as to create an indication by an electrically illuminated arrow 114, or other directional pointer, to indicate the direction of egress or exit away from the fire involved area nearer a distal end (not shown) of the second fire hose 104, e.g., nearer a nozzle (not shown), than to a distal end (not shown) of the first fire hose 102 e.g., nearer a fire truck or fire plug.

An impact resistant translucent protective lens 202 is mounted over the LEDs 112. The impact resistant translucent protective lens 202 magnifies light emitted from the LEDs 112, and protects the LEDs 112 from damage. The impact resistant translucent protective lens 202 may be removable by means of a mechanical fastening system for maintenance, repair and/or replacement purposes.

In operation, electrical energy is generated by the power generator within the male coupler 110 in response to flow of fluid, such as water, through the male coupler 110, e.g., through the coupler 106, and the first fire hose 102 and the second fire hose 104. In the embodiment shown, the fluid flow is in a direction opposite the direction indicated by the electrically illuminated arrow 114. The electrical energy may be stored in an energy storage device such as a battery, or an ultracapacitor, within the male coupler 110, or may be directly utilized. In either case, the electrical energy is used to power the light emitting diodes 112, which may be continuously illuminated, or may flash, in accordance with variations of the present embodiment.

Figure 3:
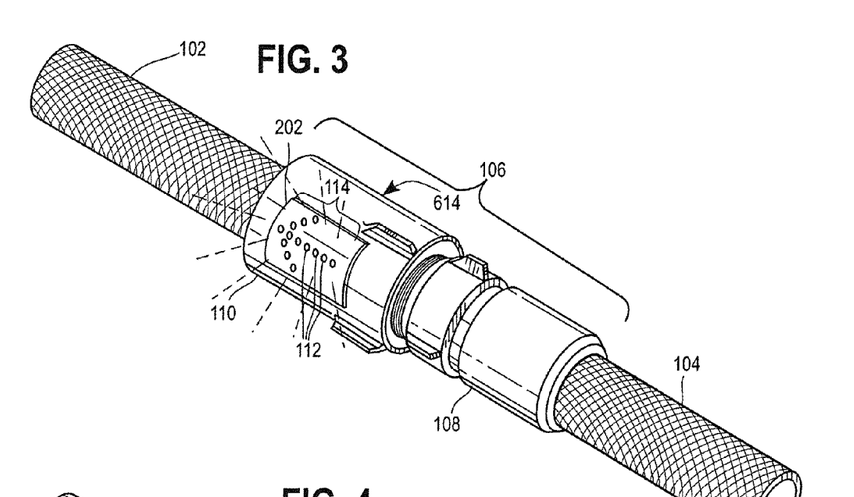
FIG. 3 is a partial perspective view of the first hose, such as the first fire hose, coupled to the second hose, such as the second fire hose, utilizing the coupler, in accordance with an additional embodiment of the present invention.

Referring next to FIG. 3, shown is a partial perspective view of the first hose 102, such as the first fire hose 102, coupled to the second hose 104, such as the second fire hose 104, utilizing the coupler 106, in accordance with an additional embodiment of the present invention. Alternatively, the coupler 106 shown may be an adapter, nozzle, or other conveyance.

The coupler 106 comprises a female coupler 108, and a male coupler 110 that are threadably engaged with one another. As shown, the male coupler 110 includes a plurality of light emitting diodes (LEDs 112) positioned so as to be visible from an exterior of the female coupler 110. (In accordance with one variation, other electrically energized illumination sources may be used, such as incandescent light bulbs, in lieu of the LEDs 112). The LEDs 112 are arranged in the form of an arrow 114 so as to create an indication by an electrically illuminated arrow 114, or other directional pointer, to indicate the direction of egress or exit away from the fire involved area nearer a distal end (not shown) of the second fire hose 104, e.g., nearer a nozzle (not shown), than to a distal end (not shown) of the first fire hose 102 e.g., nearer a fire truck or fire plug.

An impact resistant translucent protective lens 202 is be mounted over the LEDs 112. The impact resistant translucent protective lens 202 magnifies light emitted from the LEDs 112, and protects the LEDs 112 from damage. The impact resistant translucent protective lens 202 may be removable by means of a mechanical fastening system for maintenance, repair and/or replacement purposes.

In accordance with the additional embodiment, the impact resistant translucent protective lens 202 may be treated, coated or impregnated with a photo luminescent material, e.g., a photo luminescent pigment, e.g., such as is marketed under the trade name Sunfor-D-1-1, that will absorb light energy while the LEDs 112 or other lighting means are illuminated due to the generation of electrical energy from the water flowing within the fire hose conveyance, and will then continue to emit or luminesce the absorbed light energy in an photo luminescent arrow 114 pattern indicating the direction of egress or exit from the fire involved area should, for example, the flow of water within the coupling cease or be significantly reduced, thereby terminating the ability of the device to generate adequate electrical energy to energize the light source.

In operation, electrical energy is generated by the power generator within the male coupler 110 in response to flow of fluid, such as water, through the male coupler 110, e.g., through the coupler 106, and the first fire hose 102 and the second fire hose 104. In the embodiment shown, the fluid flow is in a direction opposite the direction indicated by the electrically illuminated arrow 114. The electrical energy may be stored in an energy storage device such as a battery, or an ultracapacitor, within the male coupler 110, or may be directly utilized. In either case, the electrical energy is used to power the light emitting diodes 112, which may be continuously illuminated, or may flash, in accordance with variations of the present embodiment.

Figure 4:
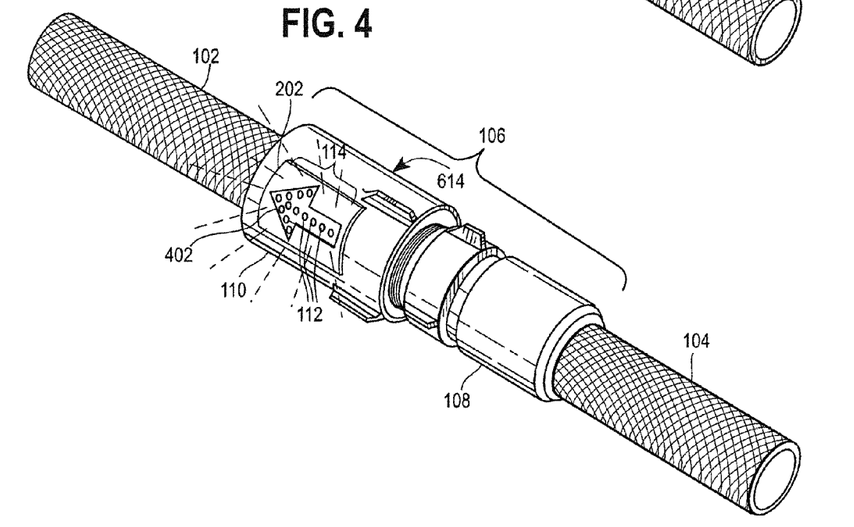
FIG. 4 is a partial perspective view of the first hose, such as the first fire hose, coupled to the second hose, such as the second fire hose, utilizing the coupler, in accordance with a further embodiment of the present invention.

Referring next to FIG. 4, shown is a partial perspective view of the first hose 102, such as the first fire hose 102, coupled to the second hose 104, such as the second fire hose 104, utilizing the coupler 106, in accordance with a further embodiment of the present invention. Alternatively, the coupler 106 shown may be an adapter, nozzle, or other conveyance.

The coupler 106 comprises a female coupler 108, and a male coupler 110 that are threadably engaged with one another. As shown, the male coupler 110 includes a plurality of light emitting diodes (LEDs 112) positioned so as to be visible from an exterior of the male coupler 110. (In accordance with one variation, other electrically energized illumination sources may be used, such as incandescent light bulbs, in lieu of the LEDs 112). The LEDs 112 are arranged in the form of an arrow 114 so as to create an indication by an electrically illuminated arrow 114, or other directional pointer, to indicate the direction of egress or exit away from the fire involved area nearer a distal end (not shown) of the second fire hose 104, e.g., nearer a nozzle (not shown), than to a distal end (not shown) of the first fire hose 102 e.g., nearer a fire truck or fire plug.

An impact resistant translucent protective lens 202 is mounted over the LEDs 112. The impact resistant translucent protective lens 202 magnifies light emitted from the LEDs 112, and protects the LEDs 112 from damage. The impact resistant translucent protective lens 202 may be removable by means of a mechanical fastening system for maintenance, repair and/or replacement purposes.

In accordance with the further embodiment, the impact resistant translucent protective lens 202 may be treated, coated or impregnated with a photo luminescent material, e.g., a photo luminescent pigment, e.g., such as is marketed under the trade name Sunfor-D-1-1, that will absorb light energy while the LEDs 112 or other lighting means are illuminated due to the generation of electrical energy from the water flowing within the fire hose conveyance, and will then continue to emit or luminesce the absorbed light energy in an photo luminescent arrow 114 pattern indicating the direction of egress or exit from the fire involved area should, for example, the flow of water within the coupling cease or be significantly reduced, thereby terminating the ability of the device to generate adequate electrical energy to energize the light source.

The impact resistant translucent protective lens 202 may also be coated with a retro-reflective material in a retro-reflective arrow outline 402 shape that outlines the perimeter of the LEDs 112. This retro-reflective arrow outline 402 shape enhances the visibility of electrically illuminated arrow 114 while the lighting system is activated by the electrical generating device, especially in dark, smoke filled, or other poor visibility circumstances.

Figure 5:
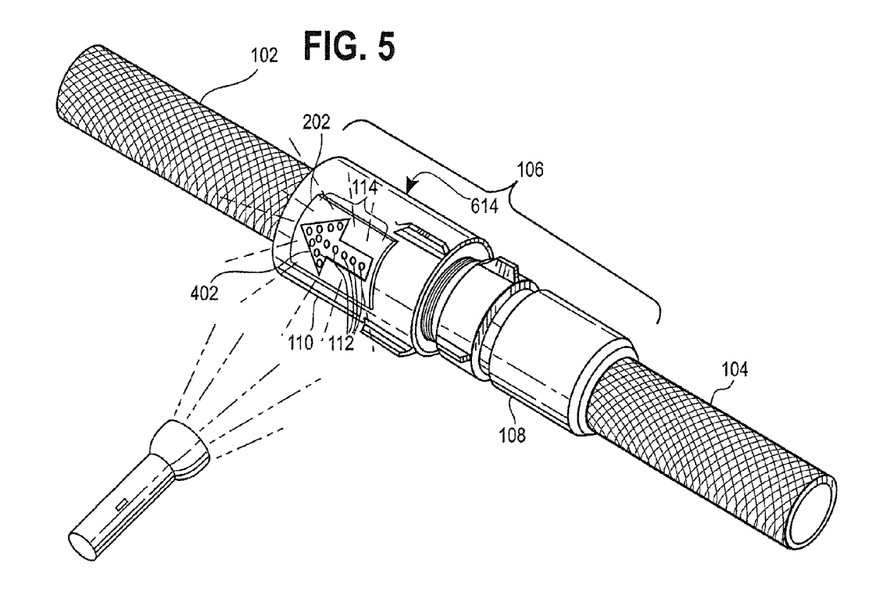
FIG. 5 is a partial perspective view of the first hose, such as the first fire hose, coupled to the second hose, such as the second fire hose, utilizing the coupler, in accordance with the further embodiment of the present invention.

Referring to FIG. 5, The retro-reflective arrow outline 402 shape may also be excited by other external lighting sources, including flashlights, building lights or other lighting means.

Referring back to FIG. 4, in operation, electrical energy is generated by the power generator within the male coupler 110 in response to flow of fluid, such as water, through the male coupler 110, e.g., through the coupler 106, and the first fire hose 102 and the second fire hose 104. In the embodiment shown, the fluid flow is in a direction opposite the direction indicated by the arrow 114. The electrical energy may be stored in an energy storage device such as a battery, or an ultracapacitor, within the male coupler 110, or may be directly utilized. In either case, the electrical energy is used to power the light emitting diodes 112, which may be continuously illuminated, or may flash, in accordance with variations of the present embodiment.

Figure 6A:
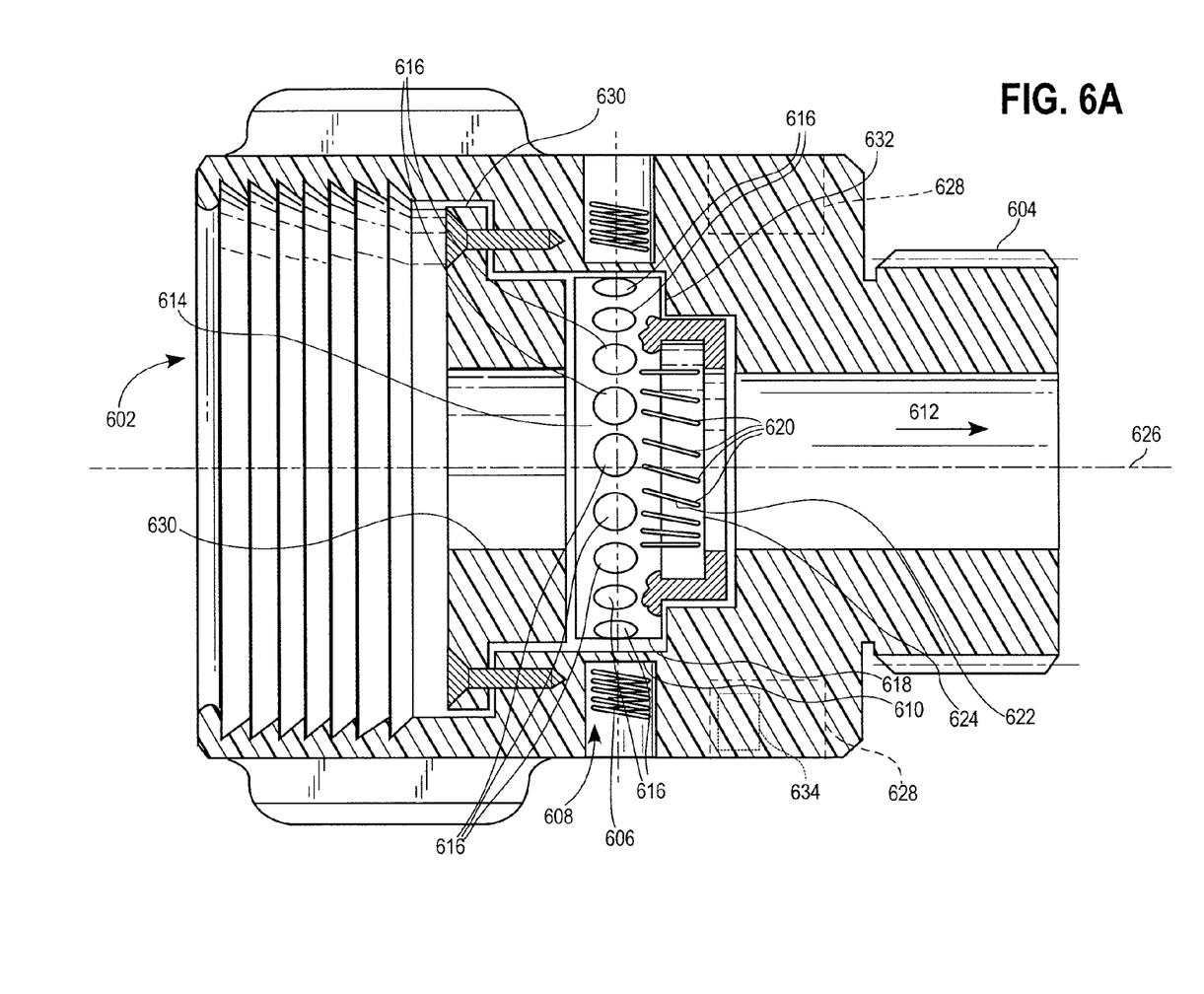
FIG. 6A is a cross-sectional view of a male coupler in accordance with one variation of the embodiment of the present invention.

Referring next to FIG. 6A, a cross-sectional view is shown of a male coupler 110 in accordance with one variation of the embodiment of the present invention. Shown is an open bowl end 602 for receiving an end of a fire hose (not shown) and an expansion ring (not shown) in a conventional manner, and a male threaded end 604 for threadably coupling to a female threaded end of the female coupler 108.

Also shown is a stator comprising a series-wound conductive coil 606 embedded within a cavity 608 at an axial flow channel periphery 610 of the male coupler 110. Positioned adjacent to the stator is a rotor 614 that is free to rotate within the male coupler 110 relative to the stator. The rotor 614 comprises a plurality of permanent magnets 616 positioned at a rotor periphery 618 of the rotor 614, which is of generally toroidal in shape and envelops the axial flow channel 612. The rotor 614 is coupled to a plurality of vanes 620 that protrude radially from the rotor 614 into the axial flow channel 612 so as to engage the fluid flow, which may be water flow, as it flows through the axial flow channel 612, imparting a rotational force to the vanes 620, and in turn the rotor 614. The vanes 620, together, comprise an impeller 622 that includes a toroidal ring 624 from which the vanes 620 project toward the central axis 626 of the axial flow channel 612, and is mechanically coupled to the rotor 614. In response to the flow of fluid within the axial flow channel 612, the rotor 614 rotates relative to the stator causing the magnetic flux lines from the permanent magnets 616 to cross the series-wound conductive coils 606 of the stator thereby inducing a current into the series-wound conductive coils 606 of the stator.

In this way, an electrical potential at an output of the series-wound coil is generated by a generator comprising the rotor 614 and the stator. The current from the stator is directed to an embedded electronics package 628, including a wireless transceiver 634, within the male coupler 108, and may be used to power electronics therein directly, or may be used to charge one or more energy storage devices so that such power can be utilized at a later time. The rotor 614 is secured mechanically in place by a rotor retainer 630 which is inserted in the open bowl end 602 of the coupler 106 in order to interpose the rotor 614 between an inner housing surface 632 of the coupler 106 and the rotor retainer 630, while still permitting rotation of the rotor 614 in response to the fluid flow.

Preferably, the vanes 620 to do not connect with one another, other than though the toroidal ring 624, and thus the vanes 620 provide an open center, or shaft-less, radial vane turbine generator. This generator design is preferred for fire hose and coupler 106 applications as it requires minimal obstruction of the axial flow channel 612, as compared to heretofore known electrical generator and turbine implementations, which are normally located in the axial flow channel 612 and rotate about a central shaft. The present variation interferes minimally with the cross section of the axial flow path, reducing water pressure or friction loss, and turbulence within a fire-fighting water stream when compared to other shaft-inclusive generator designs As will be appreciated by one of ordinary skill in the art, the embodiment of FIG. 6A can be adapted for use in a male coupler 110, a pipe fitting with male or female threaded or slip type connectors, compression fittings, or the like.

Figure 6B:
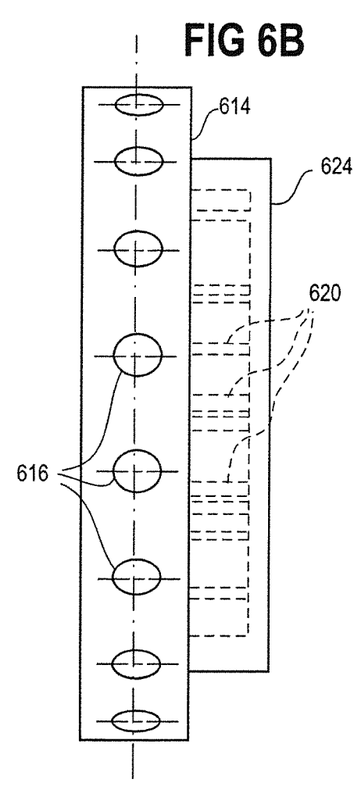
FIG. 6B is an axial view of the rotor of FIG. 6A.

Referring next to FIG. 6B, shown is an axial view of the rotor 614 of FIG. 6A. Shown is the rotor 614, the permanent magnets 616 (indicated by their center lines), the radial vanes 620, and the toroidal ring 624.

Figure 6C:
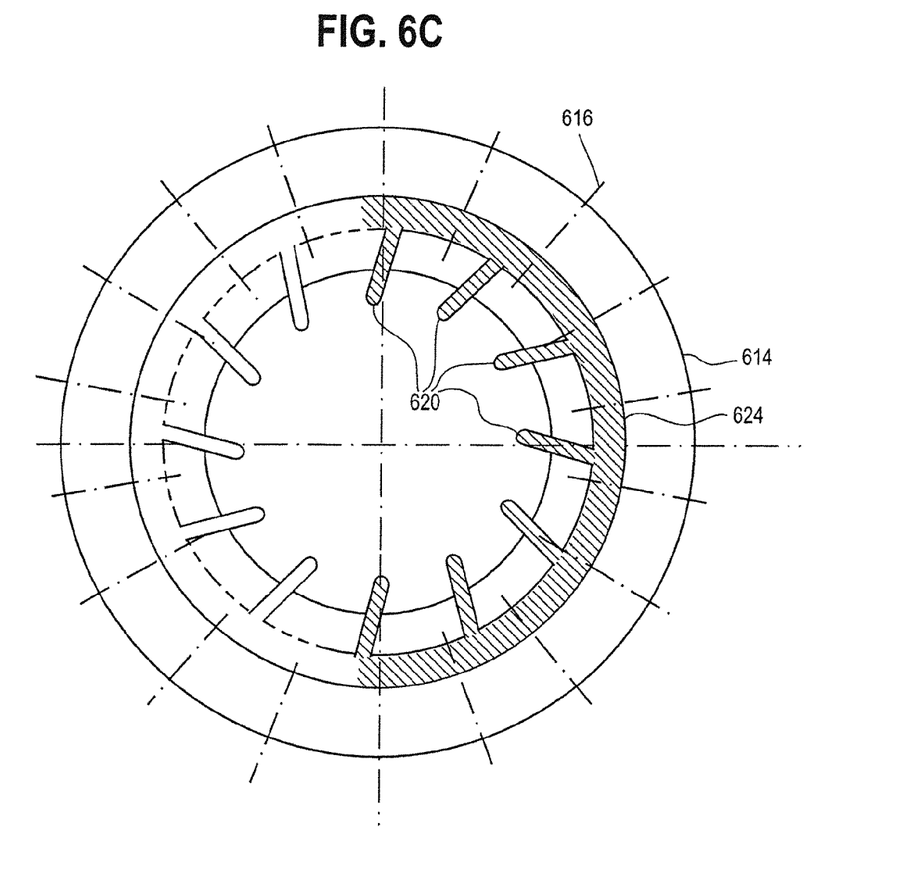
FIG. 6C is a side view of the rotor of FIG. 6B, showing the rotor, the locations of the permanent magnets, the radial vanes, and the toroidal ring.

Referring next to FIG. 6C, shown is an side view of the rotor 614, showing the rotor 614, the locations of the permanent magnets 616, the radial vanes 620, and the toroidal ring 624. The angle of the radial vanes 620 is adapted to optimize the rotational energy imparted to the rotor 614 in response to the fluid flow based on the nature of the fluid, including its viscosity and flow rate.

Referring back to FIG. 5, The shaft-less radial vane turbine generator may, in accordance with further additional embodiments, be used to provide a power source for other electrically activated devices such as, but not limited to the following: an integrated fire hose illuminating system, a flow rate measuring system, a fluid pressure measuring system, additional task lighting systems, voice or other communication systems, temperature logging systems, time logging systems, other event recording systems, any combination of the above mentioned options, as well as other electrically activated or operated devices.

The flow rate measuring system is capable of determining a rate of flow within the coupling by measuring and/or counting a number of electrical pulses or revolutions per second of the rotor 614 (also referred to herein as a tachometer or a tach-generator function). By applying an appropriate algorithm to the rotor 614 rpm rate, an accurate flow rate is determined.

In accordance with yet another further embodiment, the wireless transceiver 634 of a mesh network is powered by the shaft-less radial vane turbine generator and/or incorporated into the coupler 106, for the transmission of any data generated at the coupler 106 or for relaying data transmitted at other wireless transceivers, at, for example, 50 to 100 foot intervals.

The wireless mesh network can also be used to relay two-way voice communications, in order to overcome a common problem of a structure physically interfering with or blocking normal direct radio communication systems utilized by fire department personnel. This physical interference may occur in the following examples: reinforced concrete structures, certain metal framed structures, underground and subterranean structures, or other types of structures which are known to block normal direct radio communications.

The amount of light emitted from the LEDs 112 or the number of LEDs 112 energized is, in accordance with some embodiments, calibrated and sequenced to produce a visual indication of an actual flow rate of fluid within axial flow channel 612. By way of example, a red illuminated egress arrow 114 may be illuminated indicating a dangerously low rate of water flow from zero to 50 gallons per minute, a yellow illuminated egress arrow 114 may be illuminated indicating a low rate of flow requiring caution on the part of the operator of 51 to 100 gallons per minute, and a green illuminated egress arrow 114 may be illuminated indicating a safe flow rate of 100 plus gallons per minute. Multi-color LEDs 112, for example, can be employed to emit red light, yellow light and green light from the same LEDs 112, as a function of how the LEDs 112 are energized, e.g., by positive (e.g., red) or negative (e.g., green) DC current, or AC current (e.g., yellow). In addition, the red and yellow egress arrows 114 may also flash on and off at a varying interval in order to further focus the attention of the firefighting personnel to dangerously low flow conditions within the fire hose and nozzle combination.

The flow rates low, caution and safe flow rate ranges above are examples, and in practice are calibrated to the specific needs of a particular application for the present embodiments.

In accordance with another additional embodiment, a flow indicating function may incorporate an illuminated digital flow meter display that indicates a numeric value of the flow rate through the coupler 106 in either gallons per minute or liters per minute. In one variation of this embodiment, a flashing and/or color coded numeric flow rate value when a low, caution and/or safe flow rates are detected.

In accordance with a supplemental embodiment, a dangerous low flow indicating function may be to incorporate a loud audible alarm, generated by a sonic device incorporated into the coupler 106 and powered by the shaft-less radial vane turbine generator. The loud audible alarm is activated when a dangerously low rate of water flow is detected in the manner described hereinabove thereby warning personnel to evacuate their location immediately.

The energy storage device described hereinabove enables the electrically illuminated arrow 114, an integrated fire hose illuminating system, a flow rate measuring system, a fluid pressure measuring system, additional task lighting systems, voice or other communication systems, temperature logging systems, time logging systems, other event recording systems, any combination of the above mentioned options, as well as other electrically activated or operated devices to continue functioning even when the flow of water is terminated, resulting in the elimination of electrical power generation by the shaft-less radial vane turbine generator.

In accordance with variation, a electrically illuminated arrow 114 could be remotely activated (such as through the mesh network) to flash red indicating an exit direction for firefighters within a burning structure. The electrically illuminated arrow 114 could be activated by fire department command personnel outside of the burning structure when dangerous data conditions have been detected or observed, either through the data generated by the event recording systems, temperature logging systems, or time logging sys tems, or as the result of other external observations by the command personnel outside of the structure. (These data conditions can be communicated to command personal via, for example, the mesh network). Alternately, command personnel outside of the structure may activate the loud audible alarm, or a combination of the loud audible alarm and the electrically illuminated arrow 114.

The battery and charging system may also be used to energize other electrical and/or electronically operated systems or devices not referenced by this embodiment.

In a supplementary embodiment, non-fire-fighting systems that convey other flowing fluids or gases through pipes, hose, tubing, ducting, or other circular conveyances used to transport such items. This may include oil and gas drilling or fracking installations, refinery and chemical plant installations, transfer pipeline installations, agricultural and irrigation water installations, building heating and cooling systems, or other circumstances which require remote sensors, a remote means of generating electrical power, and a means of transmitting data with a wireless mesh network.

In a further supplementary embodiment, a miniature scale embodiment of the shaft-less radial vane generator may be incorporated into an implanted medical device that measures, records, stores and transfers data concerning the flow rate or pressure of blood within a person's cardiovascular system.

In another supplementary embodiment, the shaft-less radial vane turbine generator may generated energy to power a corona discharge system for the purpose of reducing biological pathogens in drinking water systems by using the flow of drinking water to operate the shaft-less radial vane turbine generator.

While the invention herein disclosed has been described by means of specific embodiments, examples and applications thereof, numerous modifications and variations could be made thereto by those skilled in the art without departing from the scope of the invention set forth in the claims.

What is claimed is:

1. A power generator comprising:
    a coupling adapted to couple at least two fluid conduits together;
    an axial flow channel defined by the hose coupling and having a longitudinal axis, wherein fluid flowing through the axial flow channel flows in a direction parallel to the longitudinal axis;
    a conductive coil in the coupling enveloping the axial flow channel;
    a generally toroidal rotor rotatable relative to the conductive coil, encircled by the conductive coil and enveloping the axial flow channel, wherein a portion of the axial flow channel passes with the direction substantially undisrupted through a central hole of the rotor;
    a generally toroidal rotor retainer coupled to an inner housing surface of the coupling and configured to interpose the rotor between the inner housing surface and the rotor retainer while still permitting rotation of the rotor in response to fluid flow; and
    a plurality of vanes coupled to the rotor and projecting radially inward from the rotor toward the longitudinal axis, but not intersecting the longitudinal axis, wherein proximal ends of the plurality of vanes are coupled to the rotor and distal ends of the plurality of vanes are unattached within the axial flow channel, wherein each of the plurality of vanes intersects the direction at a substantially normal angle, whereby the direction remains substantially undisrupted as the fluid flows in the axial flow channel from a first end of the coupling to a second end of the coupling.

2. The power generator of claim 1, the coupler further comprising at least one light, the at least one light electrically coupled to the conductive coil.

3. The power generator of claim 1, further comprising a wireless transceiver electrically coupled to and powered by the power generator.

* * * * *